US008347855B2

(12) United States Patent
Schoenek et al.

(10) Patent No.: US 8,347,855 B2
(45) Date of Patent: Jan. 8, 2013

(54) CONTROL SYSTEM AND METHOD FOR IMPROVING ENGINE STOP-START RESPONSE TIME

(75) Inventors: Norman Schoenek, Novi, MI (US); Michael G. Reynolds, Troy, MI (US); Amin Abboud, Livonia, MI (US); Gary E. McGee, Oxford, MI (US); Douglas R. Verner, Sterling Heights, MI (US); Sharon Liu, Ann Arbor, MI (US)

(73) Assignee: GM Global Technology Operations LLC

( * ) Notice: Subject to any disclaimer, the term of this patent is extended or adjusted under 35 U.S.C. 154(b) by 434 days.

(21) Appl. No.: 12/779,578

(22) Filed: May 13, 2010

(65) Prior Publication Data
US 2011/0277728 A1 Nov. 17, 2011

(51) Int. Cl.
*F02D 1/00* (2006.01)
(52) U.S. Cl. ............ 123/319; 123/339.16; 123/339.17; 123/339.18; 701/110
(58) Field of Classification Search .................. 123/319, 123/320, 339.16, 339.17, 339.18; 701/110, 701/112, 113
See application file for complete search history.

(56) References Cited

U.S. PATENT DOCUMENTS

| | | | | |
|---|---|---|---|---|
| 4,947,813 A * | 8/1990 | Vainshtein et al. | ........... | 123/352 |
| 6,348,743 B1 * | 2/2002 | Sakasai et al. | ............... | 290/40 B |
| 7,344,473 B2 * | 3/2008 | Ishibashi et al. | ................ | 477/52 |
| 2004/0209718 A1 * | 10/2004 | Ishibashi et al. | ................ | 474/18 |
| 2009/0224557 A1 * | 9/2009 | Reynolds et al. | ........... | 290/38 R |

* cited by examiner

*Primary Examiner* — John Kwon

(57) ABSTRACT

A control system for an engine includes a stop-start initiation module and a load control module. The stop-start initiation module shuts down the engine in response to an engine shutdown request. The load control module, in response to the engine shutdown request, increases a rate at which a rotational speed of the engine decreases during engine shutdown by increasing a rotational load input to the engine by an engine accessory coupled to a crankshaft of the engine. A method for an engine includes shutting down the engine in response to an engine shutdown request. The method further includes increasing, in response to the engine shutdown request, a rate at which a rotational speed of the engine decreases during engine shutdown by increasing a rotational load input to the engine by an engine accessory coupled to a crankshaft of the engine.

20 Claims, 3 Drawing Sheets

CONTROL SYSTEM AND METHOD FOR IMPROVING ENGINE STOP-START RESPONSE TIME

FIELD

The present disclosure relates to control of internal combustion engines, and more particularly, to stop-start engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an engine system that produces drive torque to drive wheels of the vehicle. Typically, the engine system includes an internal combustion engine. Internal combustion engines produce drive torque by combusting a mixture of air and fuel in cylinders. Combustion within the cylinders drives pistons that rotate a crankshaft and thereby produce the drive torque. Combustion of the air-fuel mixture produces exhaust that is expelled from the cylinders.

Control systems have been developed to control the drive torque produced by internal combustion engines. Stop-start engine control systems have been developed to increase fuel economy and reduce emissions. Stop-start systems selectively shut down and subsequently restart the engine during periods of vehicle operation when drive torque from the engine is not required.

For example, stop-start systems may shut down the engine as the vehicle slows to a stop when approaching a stop light. The stop-start systems may restart the engine when a driver of the vehicle releases a brake pedal and depresses an accelerator pedal, indicating vehicle acceleration is desired. The driver may release the brake pedal and depress the accelerator pedal after the vehicle comes to a stop and the stop light changes. Alternately, the driver may release the brake pedal and depress the accelerator before the vehicle comes to a stop in what may be referred to as a change of mind event. Accordingly, stop-start systems may periodically shut down and restart the engine during vehicle operation based on inputs from the driver and/or various operating conditions, such as vehicle speed and engine speed.

SUMMARY

In one form, the present disclosure provides a control system for an engine that includes a stop-start initiation module and a load control module. The stop-start initiation module shuts down the engine in response to an engine shutdown request. The load control module, in response to the engine shutdown request, increases a rate at which a rotational speed of the engine decreases during engine shutdown by increasing a rotational load input to the engine by an engine accessory coupled to a crankshaft of the engine.

In one feature, the engine accessory is rotationally driven by the crankshaft. In a related feature, the load control module may increase the rotational load by increasing a charging rate of a generator. In another related feature, the load control module may increase the rotational load by engaging a clutch of an air conditioning compressor. In yet another related feature, the load control module may increase the rotational load by increasing a cooling capacity of an air conditioning compressor.

In other features, the load control module may increase a first rotational load input by a first engine accessory while a rotational speed of the engine is within a predetermined first speed range, and may increase a second rotational load input by a second engine accessory while the rotational speed is within a predetermined second speed range different than the predetermined first speed range.

In still other features, the load control module may select the engine accessory from a group of engine accessories based on a load capacity of the engine accessory.

In further features, the load control module may increase the rotational load from a first load at a time when the engine shut down request is made to a second load prior to engine shutdown.

In still further features, the load control module may increase a first power produced by the engine accessory at a time when the engine shut down request is made to a second power during engine shutdown.

In yet further features, the load control module may decrease a rotational load generated by the engine accessory from a first load during engine shutdown to a second load following engine shutdown.

In another form, the present disclosure provides a method for an engine. The method includes shutting down the engine in response to an engine shutdown request. The method further includes increasing, in response to the engine shutdown request, a rate at which a rotational speed of the engine decreases during engine shutdown by increasing a rotational load input to the engine by an engine accessory coupled to a crankshaft of the engine.

In one feature, the engine accessory is rotationally driven by the crankshaft. In a related feature, the increasing the rotational load may include increasing a charging rate of a generator. In another related feature, the increasing the rotational load may include engaging a clutch of an air conditioning compressor. In yet another related feature, the increasing the rotational load may include increasing a cooling capacity of an air conditioning compressor.

In other features, the increasing the rotational load may include increasing a first rotational load input by a first engine accessory while a rotational speed of the engine is within a predetermined first speed range, and increasing a second rotational load input by a second engine accessory while the rotational speed is within a predetermined second speed range different than the predetermined first speed range.

In still other features, the method may further include selecting the engine accessory from a group of engine accessories based on a load capacity of the engine accessory.

In further features, the increasing the rotational load may include increasing the rotational load from a first load at a time when the engine shut down request is made to a second load prior to engine shutdown.

In still further features, the increasing the rotational load may include increasing a first power produced by the engine accessory at a time when the engine shut down request is made to a second power during engine shutdown.

In yet further features, the method may further include decreasing a rotational load generated by the engine accessory from a first load during engine shutdown to a second load following engine shutdown.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
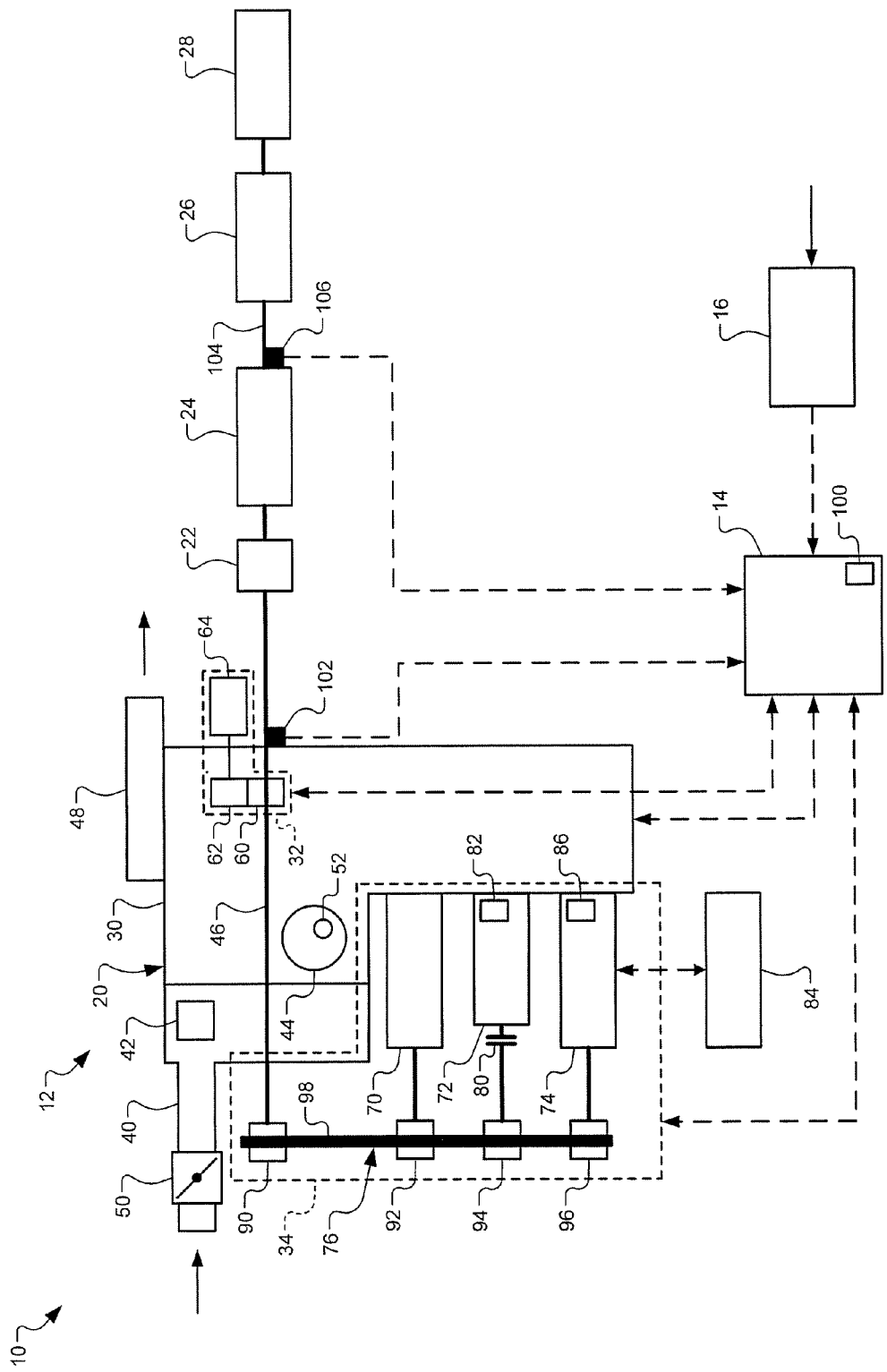
FIG. 1 is a functional block diagram of an exemplary vehicle according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Vehicle stop-start systems selectively shut down and subsequently restart an engine based on inputs from a driver of the vehicle and/or various operating conditions, such as vehicle speed and engine speed. However, the driver inputs during a period of an engine stop-start operation may rapidly change as driver intent changes. For example, the driver may initially depress a brake pedal and slow the vehicle when approaching a traffic light, then abruptly release the brake pedal and push an accelerator pedal to begin accelerating the vehicle.

When driver intent changes during a stop-start operation, a fast response time for restarting the engine may be required to meet the driver intent. However, many engine starting systems cannot be employed to restart the engine until a rotational speed of the engine is at or near zero. Depending on the rotational speed and torque output of the engine when a stop-start operation is initiated, a period of time required for the engine to coast down may exceed a desired response time for meeting the driver intent. Engine starting systems capable of restarting the engine at engine speeds above zero have been developed and may be used to reduce the response time, however, the systems typically add cost and complexity to the vehicle control system and hardware.

The present disclosure provides a system and method for improving the response time of an engine stop-start system. The system and method increases a rotational load input to the engine during a period of engine coast down. The increase in rotational load is initiated in response to an engine shutdown request. By increasing the rotational load, the system and method can increase a rate of engine coast down and decrease an engine coast down period, thereby decreasing the response time.

In an exemplary implementation, the system and method increases the rotational load by increasing the parasitic load generated by one or more engine accessories rotationally driven by the engine. For example, the system and method may employ engine accessories including, but not limited to, a generator and an air conditioning (A/C) compressor. It will be appreciated that additional parasitic load generating sources, such as an electro-magnetic brake, may be added to the system and also employed to increase the parasitic load.

The system and method may increase the parasitic load by actuating one or more accessories idled at or near the time the engine shutdown request is made. Alternately or additionally, the system and method may increase the parasitic load by increasing the power generated by an accessory. For example, a charging rate of the generator and/or a cooling capacity of the A/C compressor may be increased.

The present disclosure provides a low cost, fast-to-market stop-start system and related method. It will be appreciated that the system and method can be implemented without adding significant complexity to existing engine controls and hardware. The system and method can be implemented to reduce the response time for restarting the vehicle and thereby achieve a desired vehicle performance (e.g., vehicle acceleration) within a desired period of a change in driver intent.

With particular reference to FIG. 1, an exemplary vehicle 10 according to the present disclosure is presented. The vehicle 10 includes a powertrain 12, a control module 14, and a driver input module 16. Generally, the powertrain 12 produces drive torque and propels the vehicle 10. The control module 14 controls operation of the powertrain 12, including the drive torque produced. The control module 14 controls operation based on various inputs, including driver signals output by the driver input module 16 and various other vehicle system signals and control values according to the present disclosure. The driver input module 16 outputs the driver signals in response to inputs made by the driver.

The driver inputs include, but are not limited to, lifting or depressing a brake pedal and lifting or depressing an accelerator pedal. The vehicle system signals include, but are not limited to, signals output by sensors that sense various vehicle operating conditions, and control signals generated by various modules of the vehicle 10.

The powertrain 12 includes an engine system 20, a torque converter (TC) 22, an automatic transmission 24, a driveline 26, and one or more wheels 28. The engine system 20 produces the drive torque, which is transmitted to the transmission 24 via the TC 22. Drive torque input to the transmission 24 is transmitted at one or more gear ratios to the driveline 26, which drives one or more of the wheels 28.

The engine system 20 includes an internal combustion engine (ICE) 30, a starter system 32, and an accessory drive system 34. The engine system 20 may be a hybrid engine system including an electric motor (not shown) that produces drive torque used alone, or in combination with, the drive torque produced by the ICE 30 to propel the vehicle 10. The present disclosure is not limited to internal combustion engines of a particular type or configuration. For example, the ICE 30 may be a spark-ignition (SI) engine or a compression-ignition (CI) engine. The may be a four-stroke engine or a two-stroke engine. For exemplary purposes, the is presented as a four-stroke, reciprocating-type SI engine having a single cylinder. While a single cylinder is presented for simplicity, it will be appreciated that the may have multiple cylinders.

The includes an intake system 40, a fuel system 42, a cylinder 44, a crankshaft 46, and an exhaust system 48. During operation of the , air is drawn into the cylinder 44 through the intake system 40 and mixes with fuel supplied by the fuel system 42. The amount of air entering the cylinder 44 may be controlled by a throttle 50 disposed in the intake system 40. The timing and amount of fuel supplied by the fuel system 42 may be controlled by one or more fuel injectors (not shown).

The air-fuel (A/F) mixture is compressed by a piston (not shown) coupled to the crankshaft 46 and combusted within the cylinder 44. The timing and initiation of combustion is controlled by a spark plug 52 located in the cylinder 44. Combustion drives the piston, which in turn rotates the crankshaft 46. Exhaust produced by combustion is expelled from the cylinders into the exhaust system 48. The exhaust is treated within the exhaust system 48 to reduce the concentration of certain constituents and subsequently released into the surroundings.

The starter system 32 supplies torque to the crankshaft 46 used to crank and thereby start the . The present disclosure is not limited to a starter system of a particular configuration. In particular, the present disclosure applies to various configurations in which one or more components of the starter system 32 is disengaged from the crankshaft 46 while the is running and must be re-engaged prior to cranking. For exemplary purposes, the starter system 32 presented includes a retractable pinion and ring gear configuration.

The starter system 32 includes a ring gear 60, a drive pinion 62, and a motor/actuator 64. The ring gear 60 is fixed to rotate with the crankshaft 46. The drive pinion 62 is selectively engageable with the ring gear 60. For example, the drive pinion 62 may mesh with the ring gear 60 in a first, extended position, and may be disengaged from the ring gear 60 in a second, retracted position.

The motor/actuator 64 is operable to engage and disengage the drive pinion 62 with the ring gear 60 by extending and retracting the drive pinion 62. In various implementations, the motor/actuator 64 may rotate the drive pinion 62 while engaging the drive pinion 62 with the ring gear 60. The motor/actuator 64 may provide for engagement by synchronizing a first rotational speed of the drive pinion 62 with a second rotational speed of the ring gear 60. With the drive pinion 62 engaged, the motor/actuator 64 is operable to supply the cranking torque.

The accessory drive system 34 includes one or more accessory components that convert rotational energy supplied by the to other forms of energy used by various systems and accessories of the vehicle 10. When operated, the accessory components absorb drive torque produced by the ICE 30 and thereby generate loads, commonly referred to as parasitic loads, on the . The parasitic load generated by an accessory component may vary based on various operating conditions, including a rotational speed at which the accessory component is operated and a power output of the accessory component.

For exemplary purposes, the accessory drive system 34 presented includes a power steering (PS) pump 70, an NC compressor 72, a generator 74, and an accessory drive 76. The PS pump 70 converts rotational energy into fluid energy used by a steering system. The A/C compressor 72 converts rotational energy into cooling capacity used by a heating, ventilation, and air conditioning (HVAC) system. The A/C compressor 72 includes a clutch 80 and may further include a capacity control valve 82. The clutch 80 is an electrically-operated clutch operable to rotationally couple and de-couple the A/C compressor 72 and the accessory drive 76. The capacity control valve 82 is an electrically-operated valve operable to control the cooling capacity provided by the A/C compressor 72.

The generator 74 converts rotational energy into electrical energy used to charge a battery 84. The electrical energy may be supplied directly to the battery 84 as shown. Although not shown, the electrical energy may be supplied in parallel to other components of an electrical system of the vehicle 10. The generator 74 includes a voltage regulator 86. The voltage regulator 86 is an electrically-operated regulator operable to control a charging rate of the generator 74 by controlling a voltage output by the generator 74.

The accessory drive 76 transfers drive torque from the crankshaft 46 to the various engine accessories, including the PS pump 70, the A/C compressor 72, and the generator 74. The present disclosure is not limited to drives having a particular arrangement for transferring torque. For exemplary purposes, the accessory drive 76 presented includes a belt and pulley arrangement. The accessory drive 76 includes pulleys 90, 92, 94, 96 and a belt 98. The pulleys 90, 92, 94, 96 are fixed for rotation with the crankshaft 46, the PS pump 70, the NC compressor 72, and the generator 74, respectively. The belt 98 transfers torque between the pulleys 90, 92, 94, 96.

The control module 14 controls operation of the powertrain 12 by generating timed control signals used to control operation of the various components of the powertrain 12. In various implementations, the control module 14 may include a combination of modules, including but not limited to, a transmission control module that controls operation of the transmission 24 and an engine control module that controls operation of the engine system 20. For exemplary purposes, the control module 14 presented includes an engine control module (ECM) 100 that controls operation of the engine system 20 according to the principles of the present disclosure.

Figure 2:
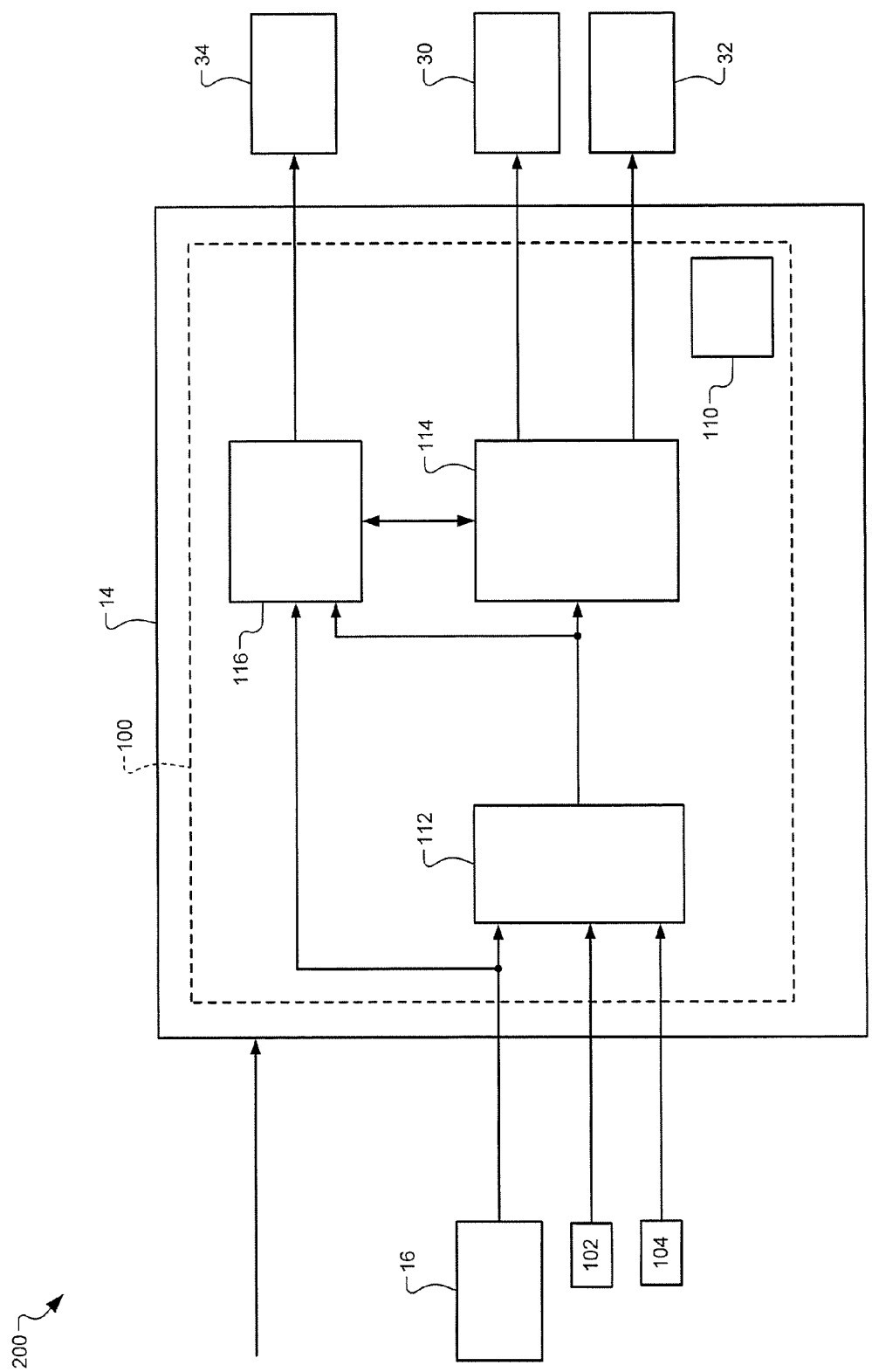
FIG. 2 is a functional block diagram of an exemplary control system for controlling a stop-start operation of an engine according to the present disclosure.

With particular reference to FIG. 2, an exemplary implementation of the ECM 100 in an exemplary stop-start engine control system 200 is presented. The ECM 100 generates timed control signals used to control operation of the various components of the engine system 20. More specifically, the ECM 100 generates timed control signals used to operate the ICE 30, the starter system 32, and the accessory drive system 34.

The control signals controlling operation of the will be referred to collectively as "engine control signals". In the present example, the engine control signals include a throttle control signal that controls a mass flow rate of air through the throttle 50. The engine control signals further include a fuel control signal that controls a timing and amount (e.g., mass) of fuel supplied by the fuel system 42, and a spark control signal that controls a spark timing of the spark supplied by the spark plug 52.

The control signals controlling operation of the starter system 32 will be referred to collectively as "starter system control signals". In the present example, the starter system control signals include motor/actuator signals that control the extension, retraction, and rotation of the drive pinion 62, and the cranking torque supplied by the motor/actuator 64.

The control signals controlling operation of the accessory drive system 34 will be referred to collectively as "accessory drive control signals". In the present example, the accessory drive control signals include an A/C clutch signal that controls the engagement and disengagement of the clutch 80, and an NC capacity signal that controls the cooling capacity of the A/C compressor via the capacity control valve 82. The accessory drive control signals further include a generator signal that controls the charging rate of the generator 74 via the voltage regulator 86.

The ECM 100 generates the various engine control signals based on various vehicle system signals received and various control values. The vehicle system signals include, but are not limited to, the driver signals output by the driver input module 16, signals output by sensors that sense various vehicle operating conditions, and control signals generated by various other modules of the vehicle 10. In the present example, the driver signals include a brake signal indicating whether the brake pedal is depressed and an accelerator pedal position signal indicative of an accelerator pedal position. The vehicle operating conditions include engine speed and vehicle speed.

Engine speed may be determined based on the rotational speed of the crankshaft 46. Vehicle speed may be determined based on a rotational speed of an output shaft 104 of the transmission 24. An engine speed sensor 102 may sense the rotational speed of the crankshaft 46 and output a signal indicative of the engine speed. A transmission speed sensor 106 may sense the rotational speed of the transmission output shaft and output a signal indicative of the vehicle speed.

The ECM 100 includes memory 110, a stop-start initiation module 112, a stop-start control module 114, and a load control module 116. The memory 110 may be non-volatile memory that stores various control values used by various other modules of the ECM 100.

The stop-start initiation module 112 determines, based on various inputs, whether to initiate a stop-start operation and once initiated, whether to end a stop-start operation. The stop-start initiation module 112 may also determine when the has come to a stop during the stop-start operation. The inputs include the driver signals, various vehicle system signals, and various control values. The stop-start initiation module 112 outputs a stop-start signal instructing the stop-start control module 114 and the load control module 116 whether to initiate engine shutdown to begin a stop-start operation, and whether to attempt engine restart to end the stop-start operation.

Generally, the stop-start initiation module 112 will request a stop-start operation during periods when the is not required to produce drive torque. Additionally, a stop-start operation may be requested during periods when it is desired that the absorb drive line torque. The stop-start initiation module 112 will generally request the stop-start operation end, and the be restarted, beginning when it is desired that the begin producing drive torque. Drive torque may be desired when the driver has indicated a desire to accelerate the vehicle 10, such as after the vehicle 10 has come to a stop and/or a change of mind event has been detected.

The present disclosure is not limited to particular control parameters and criteria for determining when to initiate and end a stop-start operation. For example, the control parameters may include a period the brake pedal is depressed (i.e., braking period), accelerator pedal position, engine speed, vehicle speed, and vehicle acceleration.

A stop-start operation may be initiated when a current braking period is greater than a predetermined braking period, a current accelerator pedal position is less than a predetermined first accelerator position, a current engine speed is less than a predetermined first engine speed, a current vehicle speed is less than a predetermined first vehicle speed, and a current vehicle acceleration is less than a predetermined first vehicle acceleration. The predetermined first engine speed, predetermined first vehicle speed, and the predetermined first vehicle acceleration may be stored for retrieval in the memory 110.

An end of the stop-start operation may be initiated when the brake pedal is no longer depressed, the current engine speed is greater than a predetermined second engine speed, the current vehicle speed is greater than a predetermined second vehicle speed, and/or the current vehicle acceleration is greater than a predetermined second vehicle acceleration. The predetermined second engine speed, predetermined second vehicle speed, and the predetermined second vehicle acceleration may be stored for retrieval in the memory 110.

The stop-start control module 114 shuts down and restarts the based on the instructions received from the stop-start initiation module 112 and various other inputs received. The stop-start control module 114 shuts down and restarts the by generating the engine control signals and starter system control signals used to control the engine system 20. The inputs may include various vehicle system signals, information communicated by the load control module 116, and various control values.

Generally, the stop-start control module 114 shuts down and restarts the in a controlled manner beginning at or near the time the instruction to shut down the is received. The stop-start control module 114 shuts down the by initiating an engine shutdown operation. Except as otherwise noted, the present disclosure is not limited to a particular manner of or operations for shutting down and restarting the . For example, the stop-start control module 114 may shut down the by disabling fuel and/or spark to the . The stop-start control module 114 may restart the by enabling fuel and spark and operating the starter system 32.

A first period of engine coast down begins when the stop-start control module 114 begins shutting down the by initiating the engine shutdown operation. The first period ends when the engine speed has reached zero or when the stop-start control module 114 initiates a restart of the .

The load control module 116 increases a rotational load input to the in response to the instruction to shut down the . More specifically, the load control module 116 increases the parasitic load generated by one or more accessory components of the accessory drive system 34. The load control module 116 increases the rotational load to increase a rate at which engine speed decreases during the first period. At the end of the first period, the load control module 116 adjusts the accessory drive control signals to prepare the accessory drive system 34 for restarting the . For example, the load control module 116 may decouple and/or idle the accessory components at the end of the first period.

In various implementations, the engine system 20 may include an auxiliary rotary power source (not shown) that continues to drive the accessory drive system 34 during periods when the has come to a stop. The load control module 116 may adjust the parasitic load generated by the accessory drive system 34 during the periods. For example, the load control module 116 may reduce the parasitic load to reduce the rotational load input to the auxiliary rotary power source.

The load control module 116 increases the parasitic load during the first period by actuating one or more accessory components idle at the time the instruction to shut down the is received. Alternately, or additionally, the load control module 116 increases the parasitic load by increasing a first load generated by an accessory component at the time the instruction to shut down the is received to a second load. The parasitic load may be increased by increasing the power generated by an accessory component from a first power at the time the instruction to shut down the is received to a second power. The second load and second power may be predetermined based on various control parameters including, but not limited to, an overall desired parasitic load during the first period.

The second load, the second power, and the overall desired parasitic load may be predetermined and stored for retrieval in the memory 110.

A capacity of an accessory component to generate an increased parasitic load can be referred to as a load capacity. The load capacity depends on various operating characteristics of the accessory component and a current parasitic load generated by the accessory component. The operating characteristics include a maximum parasitic load that an accessory component can generate. Other operating conditions being equal, the maximum parasitic load may depend on a rotational speed at which the accessory component is operated.

In various implementations, the load control module 116 may selectively increase the parasitic load of one or more accessory components based on an estimated load capacity of each accessory component. As one example, one or more accessory components used to increase the parasitic load may be selected based on the estimated load capacity. Alternately, or additionally, the load control module 116 may increase a first parasitic load generated by a first accessory component while the engine speed is within a predetermined first speed range, and increase a second parasitic load generated by a second accessory component while the engine speed is within a different, predetermined second speed range. The estimated load capacity and various speed ranges (e.g., first speed range) may be predetermined values stored in memory tables of the memory 110 for retrieval based on one or more operating parameters.

Generally, the load control module 116 will increase the parasitic load generated by the accessory drive system 34 as much as possible beginning when the request to shut down the ICE 30 is received. In this way, the engine coast down period may be reduced as much as possible. The increase in parasitic load may be limited under various conditions to avoid a perceived engine shudder by the driver. For example, the parasitic load may be limited when a temperature of the engine is low, the engine speed at the beginning of the coast down period is high, and/or the coast down period begins within a short period after a full throttle excursion.

In the present example, the load control module 116 increases the load input by the A/C compressor 72 and the generator 74. More specifically, the load control module 116 engages the clutch 80 of the A/C compressor 72 at the time the instruction to shut down the is received, if not already engaged. The load control module 116 further increases a first cooling capacity of the A/C compressor 72 at the time the instruction to shut down the is received to a maximum cooling capacity, if the A/C compressor 72 is not already operating at the maximum cooling capacity.

The load control module 116 increases a first charge rate of the generator 74 at the time the instruction to shut down the is received to a maximum charge rate. More specifically, the load control module 116 steps the charge rate up to the maximum charge rate at the time the instruction to shut down the is received. The load control module 116 maintains the charge rate at the maximum charge rate until the engine speed falls below a predetermined engine speed corresponding to a predetermined generator speed. The predetermined generator speed is a speed below which the generator 74 generally is unable to absorb energy and generate power. The predetermined engine speed and/or the predetermined generator speed may be stored for retrieval in the memory 110.

From the foregoing, it will be appreciated that the load control module 116 increases rotational load input to the at or near the beginning of the first period that the stop-start control module 114 begins shutting down the . In various implementations, the load control module 116 may increase the rotational load just prior to, at the beginning of, or during the first period. The timing of the increase in rotational load may be based on the operating conditions at the time the instruction to shut down the is received. The load control module 116 and the stop-start control module 114 may communicate and thereby effect a desired timing between the increase in the rotational load and the shutdown of the .

Figure 3:
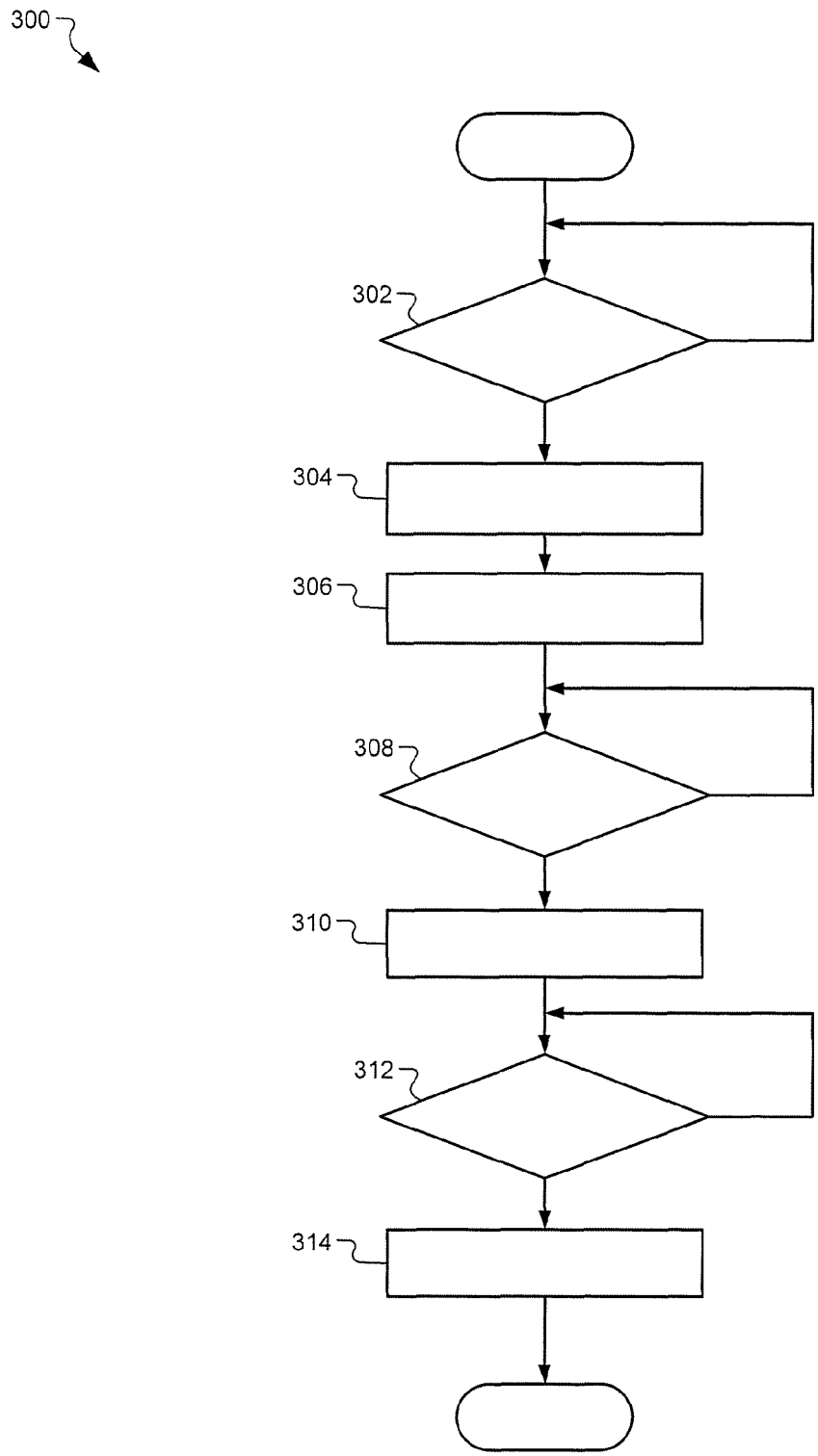
FIG. 3 is a flow chart illustrating an exemplary method for controlling a stop-start operation of an engine according to the present disclosure.

With particular reference to FIG. 3, an exemplary method 300 for controlling an engine, and more particularly, a stop-start operation of an engine according to the present disclosure is presented. The method 300 can be implemented by a computer program executed by one or more modules of an engine control system, such as the stop-start engine control system 200. The method 300 can be periodically executed during operation of the engine. Accordingly, for simplicity, the method 300 will be described with reference to various components of the stop-start engine control system 200. In this way, operation of the stop-start engine control system 200 may be more fully described and understood. It will be appreciated that the description of the stop-start engine control system 200 applies equally to the following description.

The method 300 begins at 302, where the stop-start initiation module 112 determines whether to initiate a stop-start operation. If yes, the stop start initiation module 112 outputs the instruction to initiate engine shutdown and control proceeds at one of 304 and 306. If no, control loops back as shown. Generally, the stop-start initiation module 112 will decide to initiate the stop-start operation during periods when the is not required to produce drive torque. At 302, the stop-start initiation module 112 may determine whether to initiate a stop-start operation based on the various control parameters and values discussed above.

For exemplary purposes, control may proceed at 304 as shown. At 304, the load control module 116 increases a rotational load input to the ICE 30 from a first load at the time the instruction is output at 302 to a second load. In an exemplary implementation, the load control module 116 engages the clutch 80 of the A/C compressor 72, if not already engaged. If the clutch 80 is already engaged, the load control module 116 maintains the clutch 80 in the engaged position.

At 304, the load control module 116 further steps a cooling capacity of the A/C compressor 72 from a first cooling capacity at the time the instruction is output at 302 up to a maximum cooling capacity. If the A/C compressor 72 is already operating at the maximum cooling capacity, the load control module 116 maintains cooling capacity at the maximum cooling capacity.

At 304, the load control module 116 also steps a charge rate of the generator 74 from a first charge rate at the time the instruction is output at 302 up to a maximum charge rate. If the generator 74 is already operating at the maximum charge rate, the load control module 116 maintains the maximum charge rate.

It is contemplated that, at 304, the load control module 116 may increase the rotational load input to the by employing one or more accessory components, such as the A/C compressor 72 and the generator 74 in a variety of ways to increase the parasitic load according to various control parameters (e.g., capacity) and sequences of operation. It is further contemplated that the load control module 116 may increase the rotational load input by a particular accessory component prior to, at the same time, or while control proceeds at 306.

At 306, the stop-start control module 114 initiates an engine shutdown operation. The stop-start control module 114 initiates engine shutdown by disabling fuel and/or spark to the . At 308, the stop-start initiation module 112 determines whether the has come to a stop. The stop-start initiation module 112 determines that the has come to a stop when the current engine speed reaches zero. If yes, then the stop-start initiation module 112 informs the stop-start control module 114 and the load control module 116 that the has shut down and control proceeds at 310. If no, control loops back as shown.

At 310, the load control module 116 adjusts the engine accessory load and/or the operation of the accessory drive system 34. When the accessory drive system 34 continues to be driven by an auxiliary rotary power source, the load control module 116 may reduce the engine accessory load on the auxiliary rotary power source. When the accessory drive system 34 is not driven when the has come to a stop, the load control module 116 prepares the accessory drive system 34 for restarting the . In an exemplary implementation, the load control module 116 disengages the clutch 80 of the A/C compressor 72 and steps the requested cooling capacity from the maximum cooling capacity to a minimum cooling capacity. The load control module 116 further steps the requested charge rate of the generator 74 from the maximum charge rate to a minimum charge rate.

At 312, the stop-start initiation module 112 determines whether to end the stop-start operation and restart the . If yes, then the stop-start initiation module 112 outputs the instruction to attempt engine restart and control proceeds at 314. If no, control loops back as shown. Generally, the stop-start initiation module 112 will decide to end the stop-start operation beginning when it is desired that the begin producing drive torque again. At 312, the stop-start initiation module 112 may determine whether to end the stop-start operation based on the various control parameters and values discussed above.

At 314, the stop-start control module 114 restarts the and control of the stop-start operation according to the method 300 ends.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
    a stop-start initiation module that shuts down said engine in response to an engine shutdown request; and
    a load control module that, in response to said engine shutdown request, increases a rate at which a rotational speed of said engine decreases during engine shutdown by increasing a rotational load input to said engine by an engine accessory coupled to a crankshaft of said engine.

2. The control system of claim 1, wherein said engine accessory is rotationally driven by said crankshaft.

3. The control system of claim 1, wherein said load control module increases said rotational load by increasing a charging rate of a generator.

4. The control system of claim 1, wherein said load control module increases said rotational load by engaging a clutch of an air conditioning compressor.

5. The control system of claim 1, wherein said load control module increases said rotational load by increasing a cooling capacity of an air conditioning compressor.

6. The control system of claim 1, wherein said load control module increases a first rotational load input by a first engine accessory while a rotational speed of said engine is within a predetermined first speed range, and increases a second rotational load input by a second engine accessory while said rotational speed is within a predetermined second speed range different than said predetermined first speed range.

7. The control system of claim 1, wherein said load control module selects said engine accessory from a group of engine accessories based on a load capacity of said engine accessory.

8. The control system of claim 1, wherein said load control module increases said rotational load from a first load at a time when said engine shut down request is made to a second load prior to engine shutdown.

9. The control system of claim 1, wherein said load control module increases a first power produced by said engine accessory at a time when said engine shut down request is made to a second power during engine shutdown.

10. The control system of claim 1, wherein said load control module decreases a rotational load generated by said engine accessory from a first load during engine shutdown to a second load following engine shutdown.

11. A method for an engine, comprising:
    shutting down said engine in response to an engine shutdown request; and
    increasing, in response to said engine shutdown request, a rate at which a rotational speed of said engine decreases during engine shutdown by increasing a rotational load input to said engine by an engine accessory coupled to a crankshaft of said engine.

12. The method of claim 11, wherein said engine accessory is rotationally driven by said crankshaft.

13. The method of claim 11, wherein said increasing said rotational load includes increasing a charging rate of a generator.

14. The method of claim 11, wherein said increasing said rotational load includes engaging a clutch of an air conditioning compressor.

15. The method of claim 11, wherein said increasing said rotational load includes increasing a cooling capacity of an air conditioning compressor.

16. The method of claim 11, wherein said increasing said rotational load includes increasing a first rotational load input by a first engine accessory while a rotational speed of said engine is within a predetermined first speed range, and increasing a second rotational load input by a second engine accessory while said rotational speed is within a predetermined second speed range different than said predetermined first speed range.

17. The method of claim 11, further comprising selecting said engine accessory from a group of engine accessories based on a load capacity of said engine accessory.

18. The method of claim 11, wherein said increasing said rotational load includes increasing said rotational load from a first load at a time when said engine shut down request is made to a second load prior to engine shutdown.

19. The method of claim 11, wherein said increasing said rotational load includes increasing a first power produced by said engine accessory at a time when said engine shut down request is made to a second power during engine shutdown.

20. The method of claim 11, further comprising decreasing a rotational load generated by said engine accessory from a first load during engine shutdown to a second load following engine shutdown.

* * * * *